| United States Patent [19] | [11] | 4,286,083 |
|---|---|---|
| Kochanowski | [45] | Aug. 25, 1981 |

[54] METHOD OF PREPARING POLYESTER CARBONATES

[75] Inventor: John E. Kochanowski, Stockbridge, Mass.

[73] Assignee: General Electric Company, Pittsfield, Mass.

[21] Appl. No.: 34,338

[22] Filed: Apr. 30, 1979

Related U.S. Application Data

[62] Division of Ser. No. 755,352, Dec. 29, 1976, abandoned.

[51] Int. Cl.$^3$ ................ C08G 63/64; C08L 69/00
[52] U.S. Cl. ................ 528/173; 525/439; 525/434; 525/462; 528/182; 528/199; 528/361; 528/372

[58] Field of Search ............ 528/173, 178, 182, 372, 528/361, 177; 525/439

[56] References Cited

U.S. PATENT DOCUMENTS

| 4,001,184 | 1/1977 | Scott .......................... 260/47 XA |
| 4,059,565 | 11/1977 | Yoshizaki et al. ............ 260/47 XA |

*Primary Examiner*—Theodore E. Pertilla
*Attorney, Agent, or Firm*—William F. Mufatti

[57] ABSTRACT

A novel process is disclosed for the preparation of copolyesters containing both carboxylate and carbonate groups. The process comprises reacting a carbonyl halide with a difunctional carboxylic acid and a dihydroxy compound in a reaction media which comprises water and a water immmiscible solvent in the presence of a tertiary amine.

13 Claims, No Drawings

METHOD OF PREPARING POLYESTER CARBONATES

This is a division of application Ser. No. 755,352 filed Dec. 29, 1976 now abandoned.

The present invention provides a process for the preparation of copolyesters containing both carboxylate and carbonate groups by reacting a carbonyl halide with a difunctional carboxylic acid and a dihydroxy compound in a reaction media which comprises water and a water immiscible solvent in the presence of a tertiary amine.

BACKGROUND OF THE INVENTION

The polyester carbonates and methods for their preparation are described in U.S. Pat. Nos. 3,030,331; 3,169,121 and 3,207,814, all of which are hereby incorporated by reference. Generally, the methods for the preparation of these copolymers have been based on combining the monomers in an organic reaction media through which a carbonyl halide is passed.

It has now been found that the polyester carbonates can be prepared via an interfacial process that is carried out in a reaction media which comprises water and an immiscible organic solvent.

The interfacial process provides a product that has less color than the prior art processes and simplifies the recovery of the product. The byproducts of the polymerization process remain in solution throughout the process and are easily isolated from the polymer containing organic phase. It has also been discovered that only catalytic amounts of amines are necessary while prior art processes required a molar excess. The interfacial process also permits the use of inorganic base in place of the tertiary amines that were employed in the prior art processes as halogen acid acceptors. The use of inorganic bases reduces the total cost of the process.

In addition, this invention also provides novel branched polyester carbonates that include a branching agent having at least three ester forming groups.

DETAILED DESCRIPTION OF THE INVENTION

The invention provides a process for the preparation of copolyesters containing both carboxylates and carbonate groups, said process comprising reacting a carbonyl halide with a difunctional carboxylic acid and in excess of a molar equivalent in comparison with the carboxylic acid, of a dihydroxy compound selected from the group consisting of dihydric phenols and glycols and from 0.1 to 6 mole % based on the difunctional carboxylic acid and dihydroxy compound of a chain stopper to control molecular weight. The chain stopper can be a monofunctional carboxylic acid or hydroxy compound such as phenol, p-t-butylphenol, benzoic acid, p-t-bytyl benzoic acid etc. The reaction media may comprise water and a water immiscible solvent in the presence of from 0.75 to 2.5 mole %, preferably from 1.7 to 2 mole %, of a tertiary amine based on the combined molar quantities of the difunctional carboxylic acid and dihydroxy compound.

In general, any aliphatic dihydroxy compound or glycol can be used. Included are the lower molecular weight, aliphatic dihydroxy compounds, such as ethylene glycol, propanediols; butane diols, pentanediols, hexanediols, including pinacol, heptanediols, octanediols, neopentyl glycol, aryl-alkyl glycols, such as 4,4'-dihydroxy ethyldiphenyl, styrene glycol, xylylene glycols, dihydroxy alkyl ethers of dihydric phenols such as the dihydroxy ethyl ether of Bisphenol-A, thiodiglycols and cycloaliphatic glycols such as 1,4-dihydroxycyclohexane, 2,2-bis-(4-hydroxycyclohexyl)-propane, bis-(4-hydroxycyclohexyl)-methane, among others. Among the useful higher molecular weight aliphatic dihydroxy compounds are the polyethylene glycols, polystyrene glycols, polypropylene glycols, polybutylene glycols, polythioglycols, polyaryl-alkyl ether glycols and copolymer polyether glycols, the latter typified by polyethylene glycol, polypropylene glycol copolymers sold by Wyandotte Chemical Company and known as Pluronics, etc. Included also are dihydroxy compounds such as may be derived from dibasic acids and glycols, for example, the diethyleneglycol ester of adipic acid, or the diethyleneglycol ester of sebacic acid, the dineopentyl glycol ester of adipic acid or terephthalic acid, etc. Further glycols useful in connection with the invention are silanediols such as diphenylsilanediol, dimethylsilanediol, dimethylsilanediol dimer, methylphenylsilanediol, ethylphenylsilanediol, etc. Tertiary amino-glycols are also useful, including among others N-phenyldiethanolamine, N-methyldiethanolamine, N-propyldiethanolamine and N-phenyldi-n-propanolamine. Any polymeric aliphatic material having hydroxyl end groups is useful, including polyethers, polyesters, polyurethanes, polyacetals and polysiloxanes. Furthermore, polymers terminated with —COCl groups, for example, polyesters prepared from dibasic acid chlorides, are useful, as are polymers having —OCOCl end groups, such as polycarbonates prepared from phosgene. The aliphatic dihydroxy compounds or glycols can typically be represented by the formula

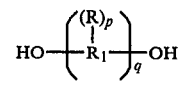

I where R is a monovalent hydrocarbon radical, for example, alkyl radicals (e.g., methyl, ethyl, propyl, isopropyl, butyl, decyl, etc.), aryl radicals (e.g., phenyl, naphthyl, biphenyl, tolyl, xylyl, etc.), aralkyl radicals (e.g., benzyl, ethylphenyl, etc.), cycloaliphatic radicals (e.g., cyclopentyl, cyclohexyl, etc.) as well as monovalent hydrocarbon radicals containing inert substituents thereon, such as halogen (chlorine, bromine, fluorine, etc.). It will be understood that where more than one R is used, they may be alike or different, $R_1$ can be selected from the group consisting of alkylene and alkylidene residues such as methylene, ethylene, propylene, propylidene, isopropylidene, butylene, butylidene, isobutylidene, amylene, isoamylene, amylidene, isoamylidene, etc. $R_1$ can also be a silane radical or can be polyalkoxy such as polyethoxy, polypropoxy, polythioethoxy, polybutoxy, polyphenylethoxy, polydiphenylsiloxy, polymethylphenylsiloxy, etc. $R_1$ can also consist of two or more alkylene or alkylidene groups as above separated by the residue of an aromatic nucleus, a tertiary amino radical, an ether radical, a carbonyl radical, a silane radical, or by a sulfur containing radical such as sulfide, sulfoxide, sulfone, etc. $R_1$ may also be a glycol dibasic acid ester residue derived from, for example, dibasic acids such as adipic, azelaic, sebacic, isophthalic, terephthalic and glycols such as have been disclosed above. Other groupings which can be represented by $R_1$ will occur to those skilled in the art. The ester residue can be polymeric or monomeric. The subscript p is a whole number including zero to a maximum determined by the number of replaceable hydrogens on $R_1$. The subscript q is an integer which may be varied as desired and $R_1$, where q is more than 1, may be like or different radicals. It is understood, of course, that mixtures of different dihydroxy compounds glycols may be used and where glycol is mentioned, such mixtures are considered to be included.

Any dihydric phenol compound is useful in the practice of the invention. The dihydric phenol compounds used in connection with the invention can typically be represented by the general formula

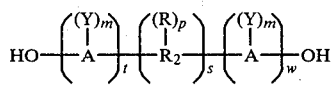

II where R is a monovalent hydrocarbon radical as above, $R_2$ is selected from the group consisting of an alkylene and alkylidene residue in the same sense as $R_1$ or an ether, a sulfur-containing linkage such as sulfide, sulfoxide, sulfone, a carbonyl, a tertiary nitrogen or a silicon-containing linkage such as silane or siloxy. $R_2$ can also consist of two or more alkylene or alkylidene groups, such as above, separated by the residue of an aromatic nucleus, a tertiary amino radical, an ether radical or by a carbonyl radical, a silene radical or by a sulfur-containing radical such as sulfide, sulfoxide, sulfone, etc. Other groupings which can be represented by $R_2$ will occur to those skilled in the art. A is the residue of an aromatic nucleus, Y is a substituent selected from the group consisting of (a) inorganic atoms, (b) inorganic radicals, and (c) organic radicals, (a), (b) and (c) being inert to and unaffected by the reactants and by the reaction conditions, m is a whole number including zero to a maximum equivalent to the number of replaceable nuclear hydrogens substituted on the aromatic hydrocarbon residue, p is a whole number including zero to a maximum determined by the number of replaceable hydrogens on $R_2$, s ranges from zero to 1, t and u are whole numbers including zero. When s is zero, however, either t or u may be zero and not both.

In the dihydric phenol compound, the substituents Y may be the same or different. When p is greater than one, the R's may be alike or different. Monovalent hydrocarbon radicals designated by R can be the same as those in reference to the compound of Formula I above, as may be those represented by $R_1$. Among the substituents represented by Y are halogen (e.g., chlorine, bromine, fluorine, etc.) or oxy radicals of the formula OW, where W is a monovalent hydrocarbon radical similar to R. Other inert substituents such as a nitro group can be represented by Y. Where s is zero in Formula II, the aromatic nuclei are directly joined with no intervening alkylene or alkylidene or other bridge. The positions of the hydroxyl groups and Y on the aromatic nuclear residues A can be varied in the ortho, meta, or para positions and the groupings can be in a vicinal, asymmetrical or symmetrical relationship, where two or more of the nuclearly bonded hydrogens of the aromatic hydrocarbon residue are substituted with Y and the hydroxyl group. Examples of dihydric phenol compounds that may be employed in this invention include, 2,2-bis-(4-hydroxyphenyl)propane (Bisphenol-A); 2,4'-dihydroxydiphenyl-methane; bis-(2-hydroxyphenyl)-methane; bis-(4-hydroxyphenyl-methane; bis-(4-hydroxy-5-nitrophenyl)-methane; bis-(4-hydroxy-2,6-dimethyl-3-methoxyphenyl)-methane; 1,1-bis-(4-hydroxyphenyl)-ethane; 1,2-bis-(4-hydroxyphenyl)-ethane; 1,1-bis-(4-hydroxy-2-chlorophenyl)-ethane; 1,1-bis-(2,5-dimethyl-4-hydroxyphenyl)-ethane; 1,3-bis-(3-methyl-4-hydroxyphenyl)-propane; 2,2-bis-(3-phenyl-4-hydroxyphenyl)-propane; 2,2-bis-(3-isopropyl-4-hydroxyphenyl)-propane; 2,2-bis-(4-hydroxynaphthyl)-propane; 2,2-bis-(4-hydroxyphenyl)pentane; 3,3-bis-(4-hydroxyphenyl)-pentane; 2,2-bis-(4-hydroxyphenyl)-heptane; bis-(4-hydroxyphenyl)-phenyl methane; bis-(4-hydroxyphenyl)-cyclohexyl methane; 1,2-bis-(4-hydroxyphenyl)-1,2-bis-(phenyl)-ethane; 2,2-bis-(4-hydroxyphenyl)-1,3-bis-phenyl)-propane; 2,2-bis-(4-hydroxyphenyl)-1-phenyl propane; and the like. Also included are dihydroxybenzenes typified by hydroquinone and resorcinol, dihydroxydiphenyls such as 4,4'-dihydroxydiphenyl; 2,2'-dihydroxydiphenyl; 2,4'-dihydroxydiphenyl; dihydroxynaphthalenes such as 2,6-dihydroxynaphthalene, etc. Dihydroxy aryl sulfones such as those set forth in application Ser. No. 613,817, filed Oct. 4, 1956, assigned to the same assignee as this invention are also useful, e.g., bis-(p-hydroxyphenyl)-sulfone; 2,4'-dihydroxydihphenyl sulfone, 5'-chloro-2,4'-dihydroxydiphenyl sulfone, 5'-chloro-2',4-dihydroxydiphenyl sulfone; 3'-chloro-4,4'-dihydroxydiphenyl sulfone; bis-(4-hydroxyphenyl diphenyl disulfone etc. The preparation of these and other useful sulfones is described in U.S. Pat. No. 2,288,282—Huissman, Polysulfones as well as substituted sulfones using halogen, nitrogen, alkyl radicals, etc. are also useful. Dihydroxy aromatic ethers such as those set forth in application Ser. No. 598,768, filed July 19, 1955, now U.S. Pat. No. 3,148,172 assigned to the same assignee as this invention are also useful. Methods of preparing such materials are found in Chemical Reviews, 38, 414–417 (1946), and U.S. Pat. No. 2,739,171—Linn. Exemplary of such dihydroxy aromatic ethers are p,p'-dihydroxydiphenyl ether; p,p'-dihydroxytriphenyl ether; the 4,3'-, 4,2'-, 4,1'-, 2,2'-, 2,3'-, etc. dihydroxydiphenyl ethers; 4,4'-dihydroxy-2,6-dimethyldiphenyl ether; 4,4'dihydroxy-2,5-dimethyldiphenyl ether; 4,4'dihydroxy-3,3'-di-isobutyldiphenyl ether; 4,4'-dihydroxy-3,3'-diisopropyldiphenyl ether 4,4'-dihydroxy, 3,2'-dinitrodiphenyl ether; 4,4'-dihydroxy-3,3'dichlorodiphenyl ether; 4,4'-dihydroxy-3,3'-difluorodiphenyl ether; 4,4'-dihydroxy-2,3'-dibromodiphenyl ether; 4,4'-dihydroxydinaphthyl ether; 4,4'-dihydroxy-3,3'-dichlorodinaphthyl ether; 2,4-dihydroxytetraphenyl ether; 4,4'-dihydroxypentaphenyl ether; 4,4'-dihydroxy-2,6-dimethoxydiphenyl ether; 4,4'-dihydroxy-2,4-diethoxydiphenyl ether, etc. Mixtures of the dihydric phenols can also be employed and where dihydric phenol is mentioned herein, mixtures of such materials are considered to be included.

In general, any difunctional carboxylic acid conventionally used in the preparation of linear polyesters may be used for the preparation of the copolyesters of the present invention. The carboxylic acids which are useful are aliphatic carboxylic acids, aliphatic-aromatic carboxylic acids or aromatic carboxylic acids. Of course, the corresponding acid halides are also useful.

The acids which are useful will generally conform to the formula

(III)

in which R′ is an alkylene, alkylidene or cycloaliphatic group in the same manner as set out above for $R_1$ in Formula 1; an alkylene, alkylidene or cycloaliphatic group containing ethylenic unsaturation; an aromatic radical such as phenylene, naphthylene, biphenylene, substituted phenylene, etc.; two or more aromatic groups connected through non-aromatic linkages such as those defined by $R_2$ in Formula H; an alkyl radical such as tolylene, xylylene, etc. R″ is either a carboxyl or a hydroxyl group. q is one where R″ is a hydroxyl group and either zero or one where R″ is a carboxyl group.

Included within the scope of this invention are the saturated, aliphatic dibasic acids derived from straight chain paraffin hydrocarbons, such as oxalic, malonic, dimethyl malonic, succinic, glutaric, adipic, pimelic, suberic, azelaic and sebacic acid. Also included are the halogen-substituted aliphatic dibasic acids. Aliphatic carboxylic acids containing hetero atoms in their aliphatic chain, such as thio-diglycollic or diglycollic acid may also be used. Also useful are such unsaturated acids as maleic or fumaric.

Suitable examples of aromatic and aliphatic aromatic dicarboxylic acids which may be used are phthalic, isophthalic, terephthalic, homophthalic, o-, m-, and p-phenyl-enediacetic acid; the polynuclear aromatic acids such as diphenic acid, and 1,4 naphthalic acid.

Examples of hydroxy acids are the aliphatic hydroxy acids such as hydroxybutyric acid, glycollic acid, and lactic acid. Examples of aromatic and aliphatic-aromatic hydroxy acids are mandelic acid, p-, m and o-hydroxy benzoic acid. The hydroxy-substituted long-chain fatty acids, such as 12-hydroxystearic acid, may also be used. Cycloaliphatic acids including tetrachydroisophthalic, 3,6-endomethylenetrahydrophthalic acid (also known as Carbic or Nadic acid), hexachloro-3,6-endomethylenetetrahydrophthalic acid (also known as Chlorendic acid) or camphoric acid may also be used.

Other useful acids are the polymerized fatty acids as, for example, those sold under the trade name "Empol" by the Emery Company, one example of which is Empol 3079-S, which is a linoleic acid dimer containing two carboxyl groups per molecule. Mixtures of the carboxylic acids can also be employed and where carboxylic acid is mentioned herein, mixtures of such materials are considered to be included.

The particular chain stopper is not critical and any suitable monofunctional carboxylic acids or monofunctional hydroxy compounds may be employed.

Generally speaking, the materials of the invention are prepared by reacting a dihydric phenol compound, a carbonate precursor such as phosgene, a carbonate ester, etc., an aliphatic dihydroxy material or glycol, and a difunctional acid.

The process of the invention may also be employed to prepare block copolyesters by a process that comprises the sequential steps of (1) passing a carbonyl halide into a mixture that contains water, a water-immiscible organic solvent containing either a dihydroxy compound or a mixture of a dihydroxy compound and a dicarboxylic acid and from 0.75 to 2.5% molar percentage of a tertiary amine based on total moles of dicarboxylic compound and dihydroxy compound, (2) adding a difunctional carboxylic acid or a dihydroxy compound to the solution, and (3) passing additional carbonyl halide into the reaction mixture to produce the block copolymer.

The process of the invention may be carried out in a reaction medium which comprises 35 parts by weight to 100 parts by weight water and 40 parts by weight to 90 parts by weight of a water immiscible solvent to from 15 parts by weight to 25 parts by weight of dicarboxylic acid compound and dihydroxy compound. The molar ratio of the dicarboxylic acid compound to the dihydroxy compound will range between 1:1.01 to 1:20. The organic solvent may be selected from the group consisting of xylene, ethylene dichloride, methylene dichloride, propylene dichloride, chlorobenzene, toluene, carbon tetrachloride, and chloroform. From 0.75 to 2.5 mole %, preferably from 1.7 to 2 mole %, based on dicarboxylic acid and dihydroxy compound of a tertiary amine is employed to act as a catalyst. In general, any tertiary amine may be used which is inert to the reaction conditions. Suitable examples of tertiary amines are trimethyl, triethyl, tributyl, tripropyl, trihexyl, tridodecyl, N,N-dimethyl cyclohexane, pyridine, quinoline, acridine, dimethylaniline and the like. Mixtures of the foregoing may also be used.

The reaction is carried out at a temperature below about 75° and preferably from 20° to 50° C.

The reaction is carried out at a pH of between about 4.5 and 8.5 preferably between about 5.5 and 6.5 by the addition of a sufficient amount of a suitable base, until the dibasic acid is consumed. The pH of the reaction is then raised to a value between 9 and 11.5 to complete the reaction. The polyestercarbonate may be isolated according to standard techniques.

The preferred base compounds are inorganic bases such as alkali metal carbonates, bicarbonates and hydroxides. The most preferred inorganic bases are the alkali metal hydroxides, i.e. sodium hydroxide, potassium hydroxide and lithium hydroxide.

The copolyester prepared by the process of the invention will comprise at least two of the following four recurring units in the chain:

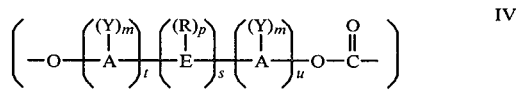

IV where the letters have the same meaning given above in Formula II.

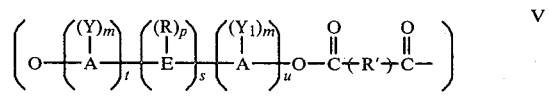

V wherein the letters have the same meaning given above in Formulae II and III.

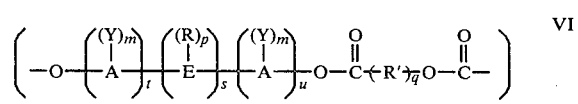

VI where the letters have the same meaning given above in Formulae II and III.

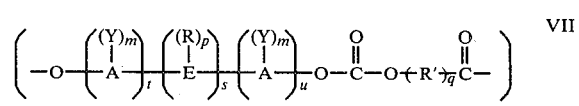

VII where the letters have the same meaning given above in Formulae II and III.

Where the difunctional carboxylic acid is a dicarboxylic acid, the copolyester will comprise recurring carbocyclic aromatic carbonate units of the type illustrated by Formula IV and carbocyclic aromatic carboxylate units of the type illustrated by Formula V above. Where the difunctional acid is a hydroxy acid, the recurring units will be those of Formulae IV, V and VII. Where both hydroxy and dicarboxylic acids are used, the copolyester will contain units of Formulae IV, V, VI and VII. The copolyesters prepared by the process of this invention will contain at least one of the units of Formula IV and at least one of the units shown by Formulae V, VI or VII and may contain as many as 500 or more of each of the foregoing units.

The branched polyestercarbonates possess extremely high melt strength and may be used in the fabrication of objects by profile extrusion or blow molding. These polymers are prepared by including in the polymerization mixture a branching agent having at least three ester forming groups. The branching agent can be one that provides branching in the acid unit portion of the polyester carbonate, or in the dihydroxy unit portion or it can be a hybrid. Illustrative of such branching agents are diphenolic acid; trimethylbenzenetricarboxylic acid; trimellitic acid; trimellitic anhydride; pentaerythritol; pentane 1,3,5-tricarboxylic acid; trimethylol propane; trimesic acid or dihydroxy carboxylic acids and hydroxydicarboxylic acids. The relative amount of branching component can vary, but will always be at a minor proportion, e.g., of up to 5 mole percent maximum, for every 100 moles of the dicarboxylic acid in the branched polyestercarbonate. Preferably, the range of branching component included in the esterification mixture will be from 0.01 to 3 mole percent based on the combined amounts of the dicarboxylic acid and dihydroxy compound.

DESCRIPTION OF THE PREFERRED EMBODIMENTS

The following examples illustrate the process of the invention. They are merely illustrative and are not to be construed to limit the invention in any manner whatsoever.

EXAMPLE 1

To a mixture of 500 ml water, 600 ml methylene chloride, 183 Bisphenol-A, 33 g isophthalic acid, 1.9 g phenol and 2.4 ml triethylamine were added 90 g phosgene over a period of thirty minutes while the pH was maintained at 6 by the addition of 50% aqueous NaOH. The pH was then raised to 10.5 while 36 g of phosgene were added over a period of 12 minutes; then, 12 g of phosgene were added at pH 11.5 over a period of eight minutes. The organic layer was diluted with 1 L. of methylene chloride then washed successively with 0.01 N NaOH, HCl (pH 1.2) and twice with water. The polyestercarbonate was isolated by conventional methods. Analysis showed, Intrinsic viscosity: 0.50 dl/gm, as measured in chloroform at 25° C. IR: 97% isophthalic acid incorporation; GPC: Mw 29,500, Mn 11,500, Mw/Mn 2.57.

EXAMPLE 2

To a mixture of 25.5 lbs Bisphenol 4.6 lbs isophthalic acid, 119 g phenol, 169 ml triethylamine, 12 gal. methylene chloride, and 7 gal. water, phosgene was added at a rate of 12.24 pounds/hour for 74 minutes while the pH was maintained at 6 by the addition of 50% NaOH, then at the rate of 6.8 pounds/hour for 24 minutes at pH 11.4. The organic layer was diluted with ten gallons of methylene chloride and washed consequtively with 0.01 N NaOH, HCl (pH 1.2) and twice with water. The polymer was isolated by known techniques.

Analysis showed: Intrinsic viscosity: 0.60 dl/gm as measured in CHCl$_3$ at 25° IR: 97.3% isophthalic acid incorporation; GPC: Mw 35,500, Mn 14,200, Mw/Mn 2.51.

The polyestercarbonate was extruded into pellets and molded into test specimens which exhibited the following properties:

| Tensile Strength | (yield) | 9440 psi |
|---|---|---|
|  |  | 10,000 psi |
| Elongation |  | 115% |
| Flexural strength | (yield) | 13,600 psi |
| Flexural modulus |  | 318,000 psi |
| Notched Izod |  | 14.3 ft lbs/in |
| DTUL | 66 psi | 149.3° C. |
|  | 264 psi | 140.7° C. |

EXAMPLE 3

To a mixture of 160 g of Bisphenol A, 50 g isophthalic acid, 1.9 g phenol, 600 ml methylenechloride, 500 ml water and 2.5 ml triethylamine were added 126 g phosgene over a period of 42 minutes while the pH was maintained at 6 by the addition of 50% NaOH. The reaction mixture was heated to 35° C. for the first 10 minutes of reaction. The pH was then raised to 11.4 for five minutes. The polymer was isolated by standard techniques. Analysis showed: n red: 0.60 dl/gm as measured in CHCl$_3$ at 25° C.; IR: 95.7% isophthalic acid incorporation.

EXAMPLE 4

To a mixture of 183 g Bisphenol-A, 33 g isophthalic acid, 1.0 g trimellitic anhydride 2.5 ml triethylamine, 600 ml methylene chloride, 500 ml water, 1.9 g phenol, and 2.5 ml triethylamine were added 105 g of phosgene over a period of 35 minutes with the pH was maintained at 6 by the addition of 50% NaOH. 69.5 g of phosgene were then added over a period of thirty minutes while the pH was maintained at 11.5. The branched polyestercarbonate was isolated by precipitation into methanol.

Analysis showed: Intrinsic viscosity 0.50 dl/gm as measured in CHCl$_3$ at 25° C.; IR; $\lambda$max 1772, 1742 cm$^{-1}$.

EXAMPLE 5

To a mixture of 183 g Bisphenol-A, 33 g isophthalic acid, 2 g pentane 1,3,5-tricarboxylic acid, 1.9 g phenol, 2.5 ml triethylamine, 600 ml methylenechloride, 500 ml H$_2$O were added 98 g phosgene over a period of 35 minutes while the pH was maintained at 6 by the addition of 50% NaOH. Then 77.6 g of phosgene were added over a period of 36 minutes while the pH was maintained at 11.5. The polymer was isolated by precipitation into isopropanol.

Analysis showed: Intrinsic viscosity 0.60 dl/gm; as measured in CHCl$_3$ at 25° C. IR: $\lambda$max 1772, 1742 cm$^{-1}$.

EXAMPLE 6

To a mixture of 183 g Besphenol A, 37.6 g azaleic acid, 1.9 g phenol, 2.5 ml triethylamine, 600 ml methylene chloride, and 500 ml water were added 105 g of phosgene over a period of 35 minutes while the pH was maintained at 6 by the addition of 50% aqueous, NaOH. 54 g phosgene were added over a period of 36 minutes while the pH was maintained at 11.4. The polyestercarbonate was isolated by precipitation into methanol.

Analysis showed; Intrinsic viscosity: 0.56 dl/gm; as measured in $CHCl_3$ at 25° C. IR: $\lambda max$ 1772, 1742 $cm^{-1}$.

EXAMPLE 7

To a mixture of 109 g tetrabromobisphenol-A 136 g Bisphenol-A, 33 g isophthalic acid, 1.9 g phenol, 2.5 ml triethylamine, 600 ml methylenechloride, and 500 ml water were added 105 g phosgene over a period of 35 minutes while the pH was maintained at 6 by the addition of 50% aqueous NaOH. Then 62 g phosgene were added over a period of 25 minutes while the pH was maintained at 11.5. The polymer was isolated by precipitation into methanol.

Analysis showed; Intrinsic viscosity 0.39 dl/gm as measured in $CHCl_3$ at 25° C. The infrared spectrum exhibited carbonate and ester bands and incorporation of the brominated component.

Although the above examples have shown various modifications of the present invention, other variations are possible in light of the above teachings. It is, therefore, to be understood that changes may be made in the particular embodiments of the invention described which are within the full intended scope of the invention as defined by the appended claims.

I claim:

1. A process for the preparation of a copolyester containing both carboxylate and carbonate groups, said copolyester having reduced coloration, comprising concurrently reacting, in the presence of a catalytic amount of a tertiary amine and an inorganic base, a carbonyl halide; a difunctional carboxylic acid; and an excess of a molar equivalent, based on the carboxylic acid, of a dihydroxy compound; which reaction is carried out in an aqueous medium comprising a water immiscible solvent wherein said inorganic base is present in an amount sufficient to maintain the reaction medium at a pH between about 4.5 and 8.5 until the carboxylic acid is consumed and thereafter increasing the amount of said inorganic base to a level sufficient to raise the pH of said reaction medium to between about 9 and 11.5 until the completion of the reaction.

2. The process of claim 1 in which the carbonyl halide is phosgene.

3. The process of claim 1 wherein the carboxylic acid is adipic acid.

4. The process of claim 1 wherein the carboxylic acid is isophthalic acid.

5. The process of claim 1 wherein the carboxylic acid is terephthalic acid.

6. The process of claim 1 wherein the carboxylic acid is azalaic acid.

7. The process of claim 1 wherein the carboxylic acid is sebasic acid.

8. The process of claim 1 wherein the dihydroxy compound is 2,2-bis(4-hydroxyphenyl)propane.

9. The process of claim 1 wherein the dihydroxy compound is 4,4'-dihydroxydiphenyl ether.

10. The process of claim 1 wherein the dihydroxy compound is 4,4'-dihydroxydiphenyl sulfone.

11. The process of claim 1 wherein the dihydroxy compound is tetrabromobisphenol-A.

12. The process of claim 1 wherein a branching agent having at least three ester-forming groups is added to the reaction.

13. The process of claim 12 wherein the branching agent is selected from the group consisting of diphenolic acid, trimethylbenzenetricarboxylic acid, trimellitic acid, trimellitic anhydride, pentaerythritol, pentane 1,3,5-tricarboxylic acid, trimethylol propane, and trimeric acid.

* * * * *

UNITED STATES PATENT AND TRADEMARK OFFICE
CERTIFICATE OF CORRECTION

PATENT NO. : 4,286,083
DATED : August 25, 1981
INVENTOR(S) : John E. Kochanowski It is certified that error appears in the above—identified patent and that said Letters Patent is hereby corrected as shown below:

At column 8, line 18, "10,000 psi" should be

-- 10,100 psi --.

Signed and Sealed this

Fourteenth Day of August 1984

[SEAL]

Attest:

GERALD J. MOSSINGHOFF

Attesting Officer

Commissioner of Patents and Trademarks